United States Patent [19]

Garbooshian

[11] Patent Number: 5,716,269
[45] Date of Patent: Feb. 10, 1998

[54] AIR CIRCULATION AND VENTILATION SYSTEM FOR USE IN AMBULANCES

[76] Inventor: Dickran Garbooshian, 8436 Flat Car Cir., Cicero, N.Y. 13039

[21] Appl. No.: 689,937

[22] Filed: Aug. 15, 1996

[51] Int. Cl.⁶ .................................................. B60H 1/26
[52] U.S. Cl. ...................... 454/139; 454/141; 454/156
[58] Field of Search .......................... 454/87, 99, 139, 454/141, 156, 188; 62/244

[56] References Cited

U.S. PATENT DOCUMENTS

| | | | |
|---|---|---|---|
| 2,319,002 | 5/1943 | Kramer | 454/141 X |
| 2,989,854 | 6/1961 | Gould | 62/244 X |
| 3,511,162 | 5/1970 | Truhan | 454/187 |
| 3,776,358 | 12/1973 | Williams | 180/84 |
| 3,841,324 | 10/1974 | Kruiswijk | 600/21 |
| 3,926,099 | 12/1975 | Grunenwald | |
| 4,608,834 | 9/1986 | Rummel | 454/156 X |
| 4,633,769 | 1/1987 | Milks | |
| 4,721,031 | 1/1988 | Nakata et al. | |
| 4,785,227 | 11/1988 | Griffin | 62/244 X |
| 4,870,895 | 10/1989 | Mayer | 454/141 X |
| 5,205,781 | 4/1993 | Kanno et al. | 454/164 |

FOREIGN PATENT DOCUMENTS

| | | | |
|---|---|---|---|
| 767739 | 7/1934 | France | 454/141 |
| 2 151 434 | 4/1973 | Germany | 454/141 |
| 62-163816 | 7/1987 | Japan | 454/139 |

*Primary Examiner*—Harold Joyce
*Attorney, Agent, or Firm*—George R. McGuire

[57] ABSTRACT

An air flow system for use in ambulance is generally comprised of a blower unit mounted in the ceiling of the ambulance's patient compartment, an air conditioning condenser, and a series of exhaust vents extending through the sidewalls of the patient compartment and positioned adjacent the floor. The exhaust vents each include a fan mounted therein for drawing the air in the patient compartment thereto and forcing the air out of the compartment. The blower unit includes louvers to permit selective air direction control, but essentially the blower unit always directs the conditioned air vertically downwardly over a patient supported on a stretcher, thereby creating an air curtain around the patient.

20 Claims, 3 Drawing Sheets

5,716,269

AIR CIRCULATION AND VENTILATION SYSTEM FOR USE IN AMBULANCES

BACKGROUND OF THE INVENTION

The present invention generally relates to air flow systems, and more particularly to the use of such systems in medical emergency vehicles for minimizing the risk of cross-contamination due to the presence of air borne pathogens.

Ambulances generally include two distinct areas separated by a wall: a driver compartment and a patient compartment. The patient compartment includes a stretcher area in the center thereof, seats on either side of the stretcher area for the emergency medical technicians or other medical personnel, a pair of doors hingedly attached to the rear of the vehicle, an exhaust fan typically positioned in the rear wall adjacent the patient access door for purposes of circulating the air in the compartment, and an exhaust port also positioned in the rear wall.

When this general configuration is used, the air will be slowly, horizontally drawn from the front of the ambulance, around the patient and across the medical personnel's breathing area, and out the exhaust port. Due to this generally horizontal flow of air, the majority of exhaled air is shared by both the medical personnel and the patient before being exhausted out of the ambulance. Hence, any infectious germs exhaled by any of the ambulance occupants will in most instances be inhaled by at least some of the occupants, thereby increasing the risk of cross-contamination due to the presence of air borne pathogens.

U.S. Pat. No. 3,926,099 to Grunenwald teaches one manner to disinfect the air in an ambulance. It discloses a method and device for disinfecting air extracted from the patient compartment of an ambulance. The device extracts the air from the compartment and burns it in a heater, thereby disinfecting all the air that passes through the ambulance. However, the path of exhaled air is essentially horizontal, the same as in conventional ambulances, and therefore before the air passes into the heater unit, some of the air borne pathogens may be inhaled by one or more occupants of the patient compartment.

It is thus a principal object of the present invention to provide an air flow system for an ambulance that prevents air borne pathogens exhaled by one individual to be inhaled by another.

It is another object of the present invention to provide an air flow system that may be retrofit into existing ambulances.

It is a further object of the present invention to provide an air flow system that will keep a constant flow of clean air passing through the patient compartment.

Other objects and advantages of the present invention will in part be obvious and in part appear hereinafter.

SUMMARY OF THE INVENTION

In accordance with the foregoing objects and advantages, the present invention provides an air flow system for the patient compartment of an ambulance which prevents air exhaled from medical personnel to be inhaled by the patient, and vice-versa. The air flow system forces fresh air in a generally vertical, downward direction over a patient seated on a stretcher and it exits the ambulance through several vents formed through the compartment's sidewalls and positioned adjacent the floor. This air flow pattern essentially creates a vertically oriented air curtain around the patient.

The air flow system is accomplished through modifications made to a conventional ambulance (e.g., a Type 3 ambulance) having a patient compartment and driver compartment separated from one another by a wall. The modifications made include mounting a blower unit to the ceiling of the patient compartment in vertically spaced relation directly above the patient stretcher/chair. An air conditioning condenser (either the conventional unit installed in the ambulance, or an auxiliary unit mounted atop the driver compartment and positioned adjacent the outwardly facing surface of the wall separating the patient and driver compartments) emits conditioned air into the patient compartment through a grill covered opening positioned through the wall separating the driver and patient compartments. The fan in the blower unit draws the air in the patient compartment thereto and then forces the air in a generally vertical, downward direction at a rate of about 150 CFM. This blower unit creates small vortices of swirling air along the walls of the ambulance which are eventually drawn into the blower, and a vertically oriented air curtain around the stretcher and patient.

An exhaust system is also provided in the ambulance to ensure a constant flow of clean air through the patient compartment with essentially no air being recycled. At least one exhaust duct is formed through each of the compartment's sidewalls, and each includes a fan positioned therein which draws the air forced downwardly by the blower unit thereto and then forces the air out of the compartment. In the event the exhaust fans are turned off, the outlet end of the exhaust ducts include spring biased flaps attached thereto to prevent outside air from entering the compartment.

With the blower unit and each exhaust vent operating at 150 CFM and 75 CFM, respectively, the air in the patient compartment would be exchanged about 1 time every 2 minutes. This would be about the minimum flow rate to ensure an effective, constant flow of clean air through the patient compartment.

With the exhaust system positioned adjacent the floor of the compartment and the fresh air being introduced through the ceiling, the present system would enhance heating the compartment during cold days by continuously exhausting the cooler, heavier air which is always near the floor. During warmer days, however, in accordance with elementary heat transfer principles, the air in the compartment would be cooled more quickly by exhausting the cooler air and leaving the warmer air to be cooled. However, due to the blower unit being mounted in the ceiling, some of the air mass within the compartment will become mixed, thus slightly diminishing the heating/cooling attributes of the system.

BRIEF DESCRIPTION OF THE DRAWINGS

The present invention will be more fully understood and fully appreciated from the following Detailed Description, taken in conjunction with the accompanying drawings, wherein.

DETAILED DESCRIPTION

Figure 1:
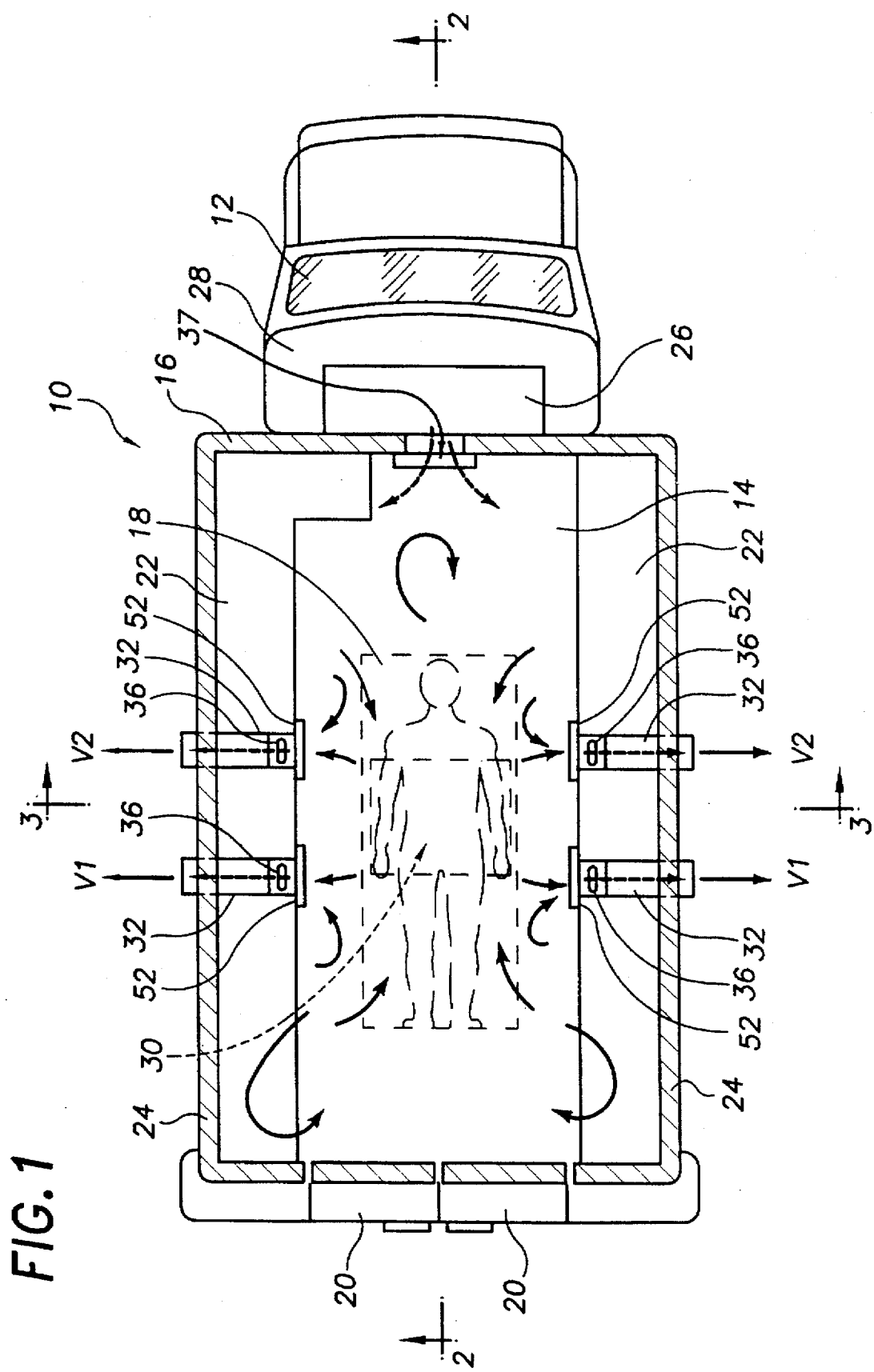
FIG. 1 is a partial cross-sectional top plan view of the present invention.
Figure 2:
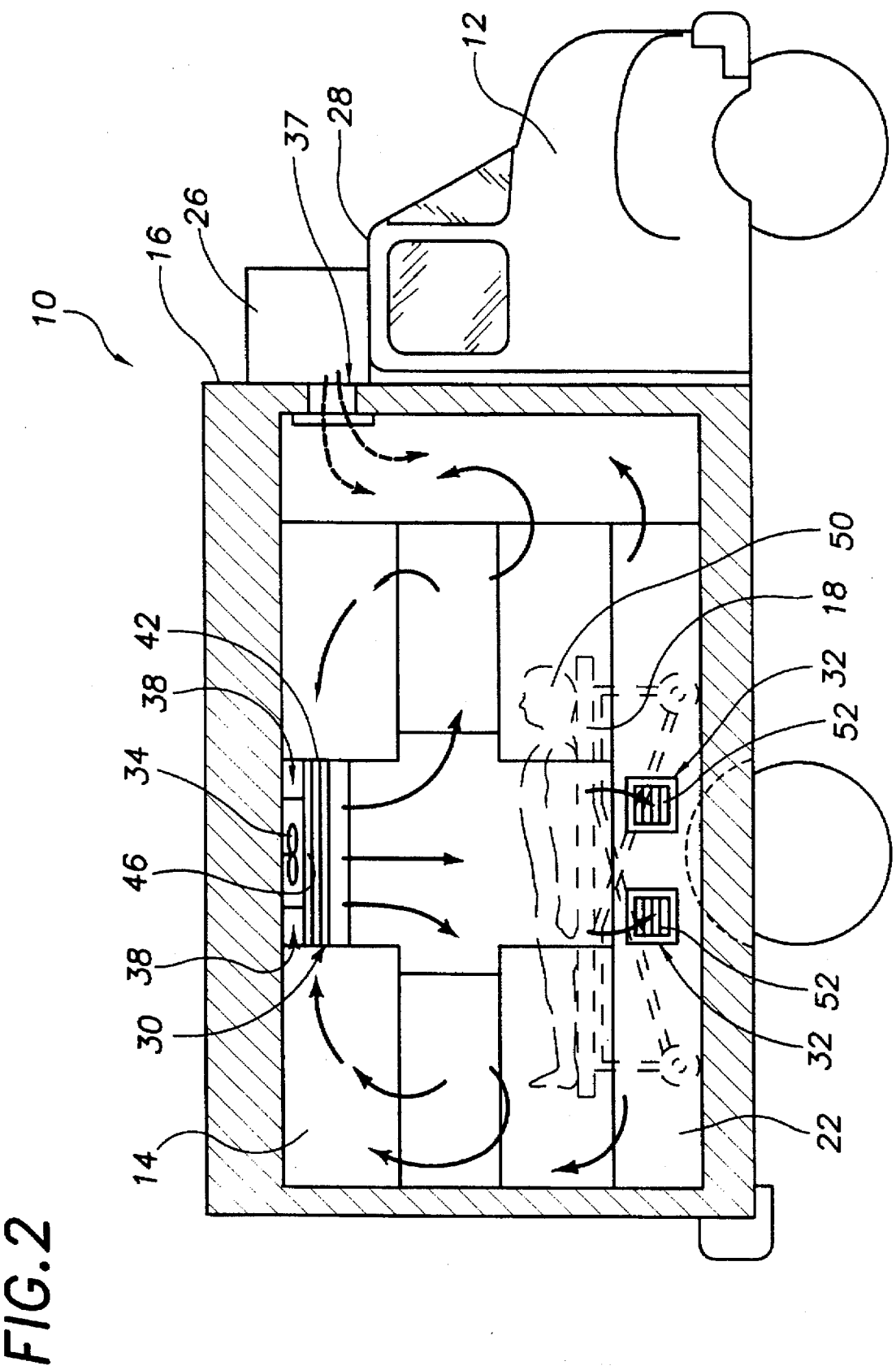
FIG. 2 is a cross-sectional view thereof taken along section line 2—2 of FIG. 1.
Figure 3:
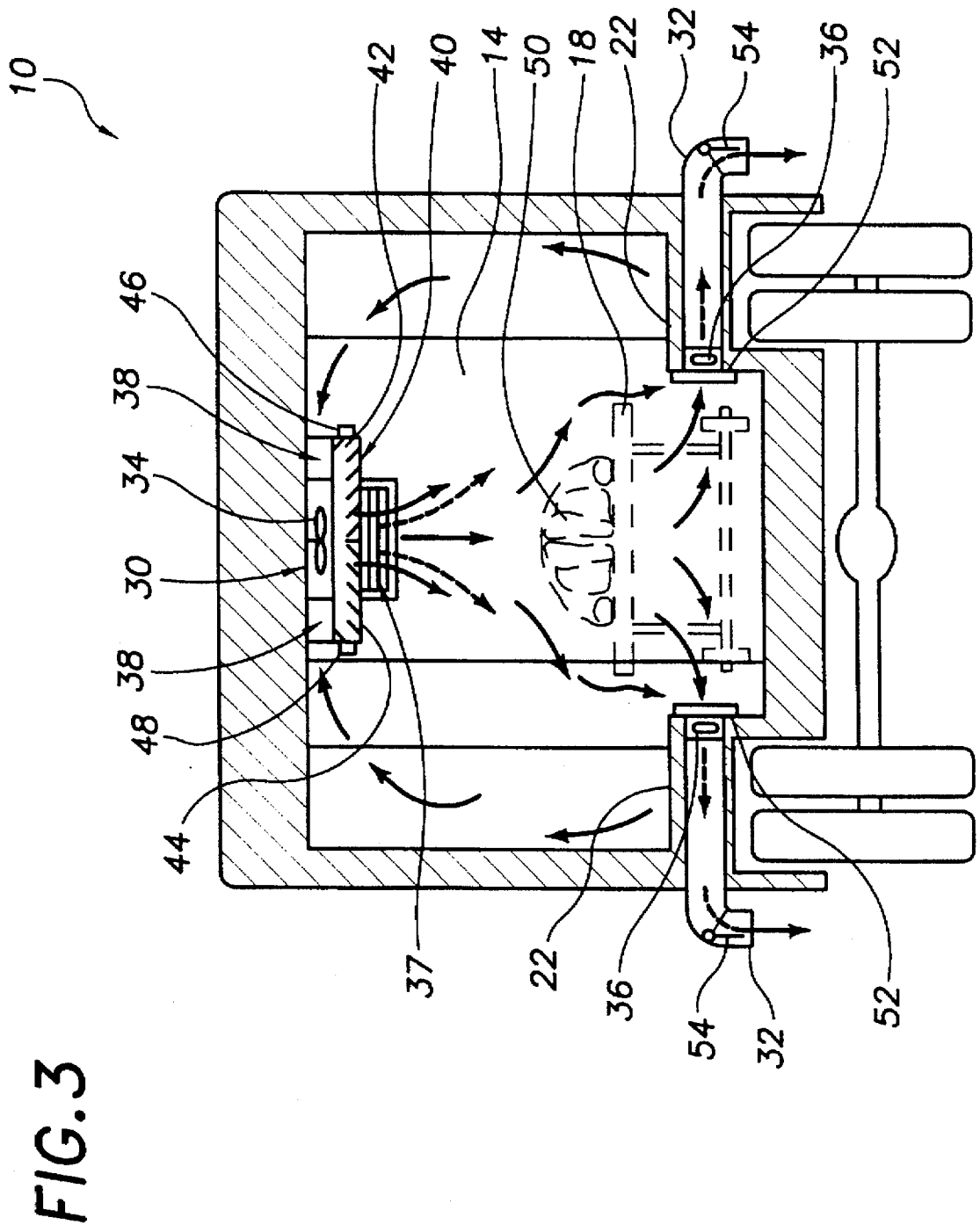
FIG. 3 is a cross-sectional view thereof taken along section line 3—3 of FIG. 1.

Referring now to the drawings, wherein like reference numerals refer to like parts throughout, there is seen in FIG. 1 a conventional ambulance (i.e., a Type 3 ambulance), denoted generally by reference numeral 10, having a driver compartment 12 and a patient compartment 14. Driver compartment 12 and patient compartment 14 are separated from one another by a wall 16 which prevents the air in one of the compartments from freely passing through to the other compartment.

Patient compartment 14 includes sufficient floor space for a stretcher 18 to be positioned centrally thereon, and rear doors 20 to permit convenient ingress and egress of stretcher 18. In addition, benches 22 are positioned along the length of the ambulance sidewalls 24. Benches 22 provide seats for emergency medical technicians, paramedics, and people travelling with the patient.

Although the conventional attributes of ambulance 10 remain, it has been modified to include an air flow system that will create a generally vertical, downward flow of air that will continuously replace the air in patient compartment 14 with fresh, conditioned air. The air flow system is generally comprised of an auxiliary air conditioning condenser 26 mounted atop the roof 28 of driver compartment 12, a blower unit 30 mounted to the ceiling of patient compartment 14, and a series of exhaust ducts 32 extending through each of the sidewalls 24 adjacent the floor of patient compartment 14. Blower unit 30 includes a fan 34 that draws the air positioned along the walls of patient compartment 14 thereto, and then blows that air in a generally vertical, downward direction over stretcher 18. As the air passes over stretcher 18 it is directed out of ambulance 10 through exhaust vents 32 positioned in each of the sidewalls 24. Exhaust vents 32 include fans 36 positioned therein that draw the air forced downwardly by blower unit 30 thereto, and then force that air out of ambulance 10. When blower unit 30 is operating at an air flow rate of 150 cubic feet per minute (CFM), and the exhaust fans are operating at 75 CFM the air exchange rate within patient compartment 14 would be about one time every two minutes (e.g., the entire volume of air present in compartment 14 will be replaced once every two minutes). This is the minimum at which the system should be run in order to effectively and continuously provide clean air to patient compartment 14, and ensure that practically all air borne pathogens will be forced out of ambulance 10 before being inhaled by one of the ambulances' occupants.

Condenser 26 is mounted on the roof of driver compartment 12 adjacent wall 16 and it emits clean, conditioned air into patient compartment 14 through a grill covered opening 37 formed through wall 16. Although the air exchange system could operate by utilizing the pre-installed air conditioning condenser positioned beneath the hood of ambulance 10, using an auxiliary condenser, such as condenser 26, increases efficiency of the air exchange system while not diminishing the operating efficiency of the preinstalled condenser. In the event warm air is needed to be supplied to patient compartment 14, condenser 26 could be selectively turned off, and a conventional heater unit (not shown) could be turned on which would provide warm air to patient compartment 14.

Blower unit 30, which is either hard wired to the ambulances' electrical system which would thereby provide continuous power to blower unit 30 while the ambulance's ignition is on, or may be selectively operable via an on-off switch (not shown) to which it is electrically connected and which is positioned in either driver compartment 12 or patient compartment 14, receives the conditioned air positioned along the walls and ceiling of compartment 14 through its inlet 38 due to the suction created by fan 34. Once collected by blower unit 30, the air is forced through the blowers' outlet 40 in a generally vertical, downward direction over stretcher 18. After passing through blower unit 30, the downward direction of the dispersed air through outlet 40 may be slightly adjusted via louver sets 42 and 44 positioned within outlet 40. The position of louvers 42 and 44 are selectively controlled by knobs 46 and 48, respectively. Accordingly, the direction of air flow may be selectively adjusted to accommodate individual situations, such as when a patient 50 is sitting in a supine position (not shown) or lying horizontally on stretcher 18 (shown).

Consequently, proper control of blower unit 30 ensures that air exhaled from patient 50 (particularly through sneezing or coughing) will be caught in the down draft and forced towards the floor rather than being left to float in the air flow where it may possibly be inhaled by another person in patient compartment 14. Of course the opposite is true as well, air exhaled by a person in compartment 14 will be caught in the down draft and forced towards the floor and exhaust vents 32 before patient 50 could inhale the air. Thus, the risk of cross-contamination through air borne pathogens will be significantly reduced and may be essentially eliminated. For sufficient operation of the air exchange system, fan 34 should operate at around 150 CFM.

In order to keep fresh air circulating through compartment 14, and to prevent recycling of air, exhaust vents 32 are mounted adjacent the compartment's floor and through sidewalls 24 (vents 32 actually pass through benches 22 before passing through sidewalls 24). As illustrated in FIG. 1, first and second pairs of vents 32 mounted through sidewalls 24 are axially aligned with one another along axes V1—V1 and V2—V2, respectively, and axes V1—V1 and V2—V2 intersect (perpendicularly) stretcher 18 (or at least the space occupied by stretcher 18). This positioning ensures that the air being forced downwardly over stretcher 18 will be drawn into vents 32, and not left to be recycled through blower unit 30.

Exhaust vents 32 each include a fan 36 mounted at the inlets thereof which draw air from within compartment 14 thereto, and force the air out of compartment 14 as indicated by the arrows illustrated (within vents 32) in the drawings. The fans are either hard wired directly to the ambulance's electrical system to provide continuous power thereto, or they may be selectively operable via an on-off switch (not shown) to which they are electrically connected and which are positioned in either driver compartment 12 or patient compartment 14. A mesh screen 52 is positioned over the inlet of each vent 32 in order to prevent small objects from being drawn into fan 36. Vents 32 include spring biased rubber flaps 54 attached to the outlet ends thereof in order to prevent outside air from entering compartment 14 through vents 32 when the fans are turned off. For sufficient operation of the air exchange system, fans 36 should each operate in the range of 75–100 CFM.

When both blower unit 30 and exhaust vents 32 are turned on, the resulting air flow is a combination of upwardly and horizontally directed, swirling air along the walls and ceiling, respectively, of compartment 14 which eventually finds its way through inlet 38, and a generally vertical, downward flow of air over stretcher 18 (the air flow is indicated by the directional arrows illustrated in the Figures). As the downwardly directed air approaches the floor, its trajectory begins to level off and is eventually drawn by fans 36 horizontally out of patient compartment 14 through vents 32. This direction of air flow generally creates a vertically oriented curtain of down drafting air around patient 50, neither permitting their exhaled air from being inhaled by another person located in compartment 14, nor permitting air exhaled by a person other than patient 50 to be inhaled by the patient.

What is claimed is:

1. In an air flow system for an ambulance having a driver compartment and a patient compartment separated from one another by a wall, and an air conditioner condenser for conditioning the air before it enters said patient compartment, said patient compartment having a floor area for receiving a stretcher centrally thereon, first and second sidewalls extending rearwardly from said separating wall in spaced, parallel relation to one another, at least one rear door, and a ceiling, said driver compartment including a roof, improvements to said ambulance air flow system comprising:
    a) a blower unit having inlet and outlet ends and mounted to said ceiling of said patient compartment in vertically spaced relation directly above said stretcher receiving floor area, said blower unit drawing air positioned adjacent said wall, first and second sidewalls, ceiling, and rear door and forcing said air in a generally vertical, downward direction over said stretcher;
    b) at least one exhaust vent positioned adjacent said floor area and extending through each of said first and second sidewalls, said at least one exhaust vent including a fan mounted therein for drawing the air directed vertically downward by said blower unit thereto and forcing said air out of said patient compartment;
    c) means for preventing said air forced outside of said patient compartment from re-entering said patient compartment.

2. The air flow system according to claim 1 wherein said air conditioner condenser is mounted atop said roof of said driver compartment and adjacent said separating wall.

3. The air flow system according to claim 1 and further comprising first and second means for actuating said blower unit and said fans in said exhaust vents, respectively, which are first and second on-off switches, respectively, electrically connected to said blower unit and said fans in said exhaust vents, respectively, and mounted in either of said driver compartment and said patient compartment.

4. The air flow system according to claim 1 wherein said means for preventing said outside air from re-entering said patient compartment are spring biased flaps mounted on said exhaust vents which are oriented so as to permit said air in said patient compartment to pass out of said vents but prohibit outside air from entering said vents.

5. The air flow system according to claim 1 and further comprising means for selectively controlling the direction of said air dispersed from said blower unit.

6. The air flow system according to claim 5 wherein said air direction control means include at least one set of selectively adjustable louvers attached to said outlet end of said blower unit.

7. The air flow system according to claim 1 wherein each of said fans in said exhaust vents can move air in the range of 75–100 cubic feet per minute.

8. The air flow system according to claim 1 wherein said blower unit and said exhaust vents are operable in combination with one another to completely exchange said air in said patient compartment a minimum of one time every two minutes.

9. The air flow system according to claim 1 wherein said blower unit operates at a rate of at least 150 cubic feet per minute.

10. The air flow system of claim 1 wherein said at least one pair of said at least one exhaust vents formed through each of said first and second sidewalls are aligned with one another along an axis which extends in intersecting relation to said stretcher receiving floor area.

11. In an air flow system for an ambulance having a driver compartment and a patient compartment separated from one another by a wall, and an air conditioner condenser for conditioning the air before it enters said patient compartment, said patient compartment having a floor area for receiving a stretcher centrally thereon, first and second sidewalls extending rearwardly from said separating wall in spaced, parallel relation to one another, at least one rear door, and a ceiling, said driver compartment including a roof, improvements to said ambulance air flow system comprising:
    a) a blower unit having inlet and outlet ends and mounted to said ceiling of said patient compartment, said blower unit drawing air positioned adjacent said wall, first and second sidewalls, ceiling, and rear door and forcing said air in a generally vertical, downward direction over said stretcher;
    b) at least one first exhaust vent extending through said first sidewall and at least one second exhaust vent extending through said second sidewall, said first and second exhaust vents being aligned with one another along an axis which extends in intersecting relation to said stretcher receiving floor area;
    c) means for preventing said air forced outside of said patient compartment from re-entering said patient compartment.

12. The air flow system according to claim 11 wherein said said blower unit is positioned in vertically spaced relation directly above said stretcher receiving floor area.

13. The air flow system according to claim 11 wherein said air conditioner condenser is mounted atop said roof of said driver compartment and adjacent said separating wall.

14. The air flow system according to claim 11 and further comprising first and second means for actuating said blower unit and said fans in said exhaust vents, respectively, which are first and second on-off switches, respectively, electrically connected to said blower unit and said fans in said exhaust vents, respectively, and mounted in either of said driver compartment and said patient compartment.

15. The air flow system according to claim 11 wherein said means for preventing said outside air from re-entering said patient compartment are spring biased flaps mounted on said exhaust vents which are oriented so as to permit said air in said patient compartment to pass out of said vents but prohibit outside air from entering said vents.

16. The air flow system according to claim 11 and further comprising means for selectively controlling the direction of said air dispersed from said blower unit.

17. The air flow system according to claim 16 wherein said air direction control means include at least one set of selectively adjustable louvers attached to said outlet end of said blower unit.

18. The air flow system according to claim 11 wherein each of said fans in said exhaust vents can move air in the range of 75–100 cubic feet per minute.

19. The air flow system according to claim 11 wherein said blower unit and said exhaust vents are operable in combination with one another to completely exchange said air in said patient compartment a minimum of one time every two minutes.

20. The air flow system according to claim 11 wherein said blower unit operates at a rate of at least 150 cubic feet per minute.

* * * * *